(12) United States Patent
Kienle

(10) Patent No.: US 10,995,651 B2
(45) Date of Patent: May 4, 2021

(54) EXHAUST SYSTEM FOR A COMBUSTION ENGINE OF A MOTOR VEHICLE AND MOTOR VEHICLE

(71) Applicant: Faurecia Emissions Control Technologies, Germany GmbH, Augsburg (DE)

(72) Inventor: Boris Kienle, Augsburg (DE)

(73) Assignee: Faurecia Emissions Control Technologies, Germany GmbH

( * ) Notice: Subject to any disclaimer, the term of this patent is extended or adjusted under 35 U.S.C. 154(b) by 161 days.

(21) Appl. No.: 16/223,367

(22) Filed: Dec. 18, 2018

(65) Prior Publication Data

US 2019/0195116 A1 Jun. 27, 2019

(30) Foreign Application Priority Data

Dec. 21, 2017 (DE) ..................... 10 2017 130 866.0

(51) Int. Cl.
*B60K 13/04* (2006.01)
*F01N 13/18* (2010.01)
*F01N 13/02* (2010.01)
*F01N 13/08* (2010.01)

(52) U.S. Cl.
CPC .......... *F01N 13/1805* (2013.01); *B60K 13/04* (2013.01); *F01N 13/02* (2013.01); *F01N 13/08* (2013.01)

(58) Field of Classification Search
CPC ...... F01N 13/1805; F01N 13/02; F01N 13/08; B60K 13/04
See application file for complete search history.

(56) References Cited

U.S. PATENT DOCUMENTS

| 3,731,973 | A | * | 5/1973 | Kermode | ................ | F01N 13/00 |
|---|---|---|---|---|---|---|
| | | | | | | 298/1 H |
| 4,105,090 | A | * | 8/1978 | Tachibana | ................ | F01N 1/10 |
| | | | | | | 181/265 |
| 5,002,244 | A | * | 3/1991 | Holbury | .................. | F16L 3/223 |
| | | | | | | 206/509 |
| 5,029,668 | A | * | 7/1991 | Murakawa | .............. | F01N 13/08 |
| | | | | | | 181/240 |
| 5,195,607 | A | * | 3/1993 | Shimada | .................. | F01N 3/28 |
| | | | | | | 180/296 |
| 7,220,365 | B2 | * | 5/2007 | Qu | ......................... | F24S 10/95 |
| | | | | | | 252/70 |

(Continued)

FOREIGN PATENT DOCUMENTS

| DE | 1480626 A | 9/1969 |
|---|---|---|
| DE | 102012110553 A1 | 6/2013 |

(Continued)

OTHER PUBLICATIONS

German Search Report for German Application No. 10 2017 130 866.0, dated Oct. 2, 2018.

*Primary Examiner* — Jacob B Meyer
(74) *Attorney, Agent, or Firm* — Carlson, Gaskey & Olds, P.C.

(57) ABSTRACT

An exhaust system for a combustion engine of a motor vehicle comprises a support plate on which at least one exhaust line or at least one exhaust silencer is provided. The support plate is made of a plastic material. A motor vehicle comprises a combustion engine and an exhaust system which is arranged in an underfloor tunnel of the motor vehicle.

20 Claims, 2 Drawing Sheets

(56) References Cited

U.S. PATENT DOCUMENTS

| | | | | |
|---|---|---|---|---|
| 8,432,658 B1* | 4/2013 | Heise | | F01N 13/1822 |
| | | | | 361/217 |
| 8,505,672 B2* | 8/2013 | Schulze | | B60K 1/04 |
| | | | | 180/309 |
| 8,936,220 B2* | 1/2015 | Schulze | | B60K 1/04 |
| | | | | 248/68.1 |
| 8,943,813 B2* | 2/2015 | Kamei | | E02F 9/0866 |
| | | | | 60/311 |
| 8,997,922 B1* | 4/2015 | Yoshida | | F01N 1/10 |
| | | | | 181/231 |
| 9,429,056 B2* | 8/2016 | Maeda | | F01N 3/021 |
| 2001/0047897 A1* | 12/2001 | Steenackers | | B60K 13/04 |
| | | | | 180/89.2 |
| 2005/0127248 A1* | 6/2005 | Suzuki | | F16L 55/035 |
| | | | | 248/68.1 |
| 2006/0042871 A1* | 3/2006 | Yasuda | | F01N 1/24 |
| | | | | 181/227 |
| 2009/0032318 A1* | 2/2009 | Ishitoya | | B60K 1/04 |
| | | | | 180/65.31 |
| 2009/0166489 A1* | 7/2009 | Volchko | | F16L 3/223 |
| | | | | 248/205.1 |
| 2010/0078966 A1* | 4/2010 | Onoda | | B62D 25/2036 |
| | | | | 296/193.07 |
| 2012/0011833 A1* | 1/2012 | Kamei | | E02F 9/0866 |
| | | | | 60/297 |
| 2012/0205501 A1* | 8/2012 | Arzate-Engels | | F16L 3/222 |
| | | | | 248/68.1 |
| 2013/0048408 A1* | 2/2013 | Schulze | | B60K 1/04 |
| | | | | 180/309 |
| 2013/0120893 A1* | 5/2013 | Heise | | F01N 13/1822 |
| | | | | 361/217 |
| 2013/0146169 A1* | 6/2013 | Schulze | | B60K 13/06 |
| | | | | 138/106 |
| 2014/0116797 A1* | 5/2014 | Hayashi | | B60K 13/04 |
| | | | | 180/309 |
| 2015/0114750 A1* | 4/2015 | Yoshida | | F01N 1/10 |
| | | | | 181/228 |
| 2015/0184568 A1* | 7/2015 | Maeda | | F01N 3/2066 |
| | | | | 60/286 |
| 2016/0053645 A1* | 2/2016 | Sandou | | F01N 3/2066 |
| | | | | 60/301 |
| 2019/0085749 A1* | 3/2019 | Willats | | B01D 53/9477 |
| 2019/0195116 A1* | 6/2019 | Kienle | | B60K 13/04 |
| 2020/0149459 A1* | 5/2020 | Lampe | | F01N 13/1805 |

FOREIGN PATENT DOCUMENTS

| | | |
|---|---|---|
| DE | 102012214633 A1 | 6/2013 |
| DE | 102016106820 A1 | 8/2017 |
| GB | 1129287 A | 10/1968 |

* cited by examiner

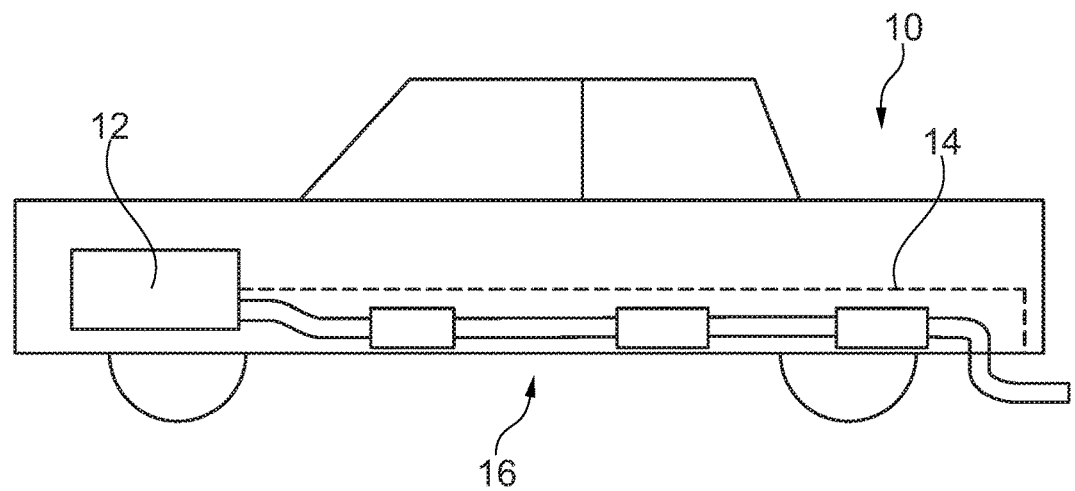
Fig. 1
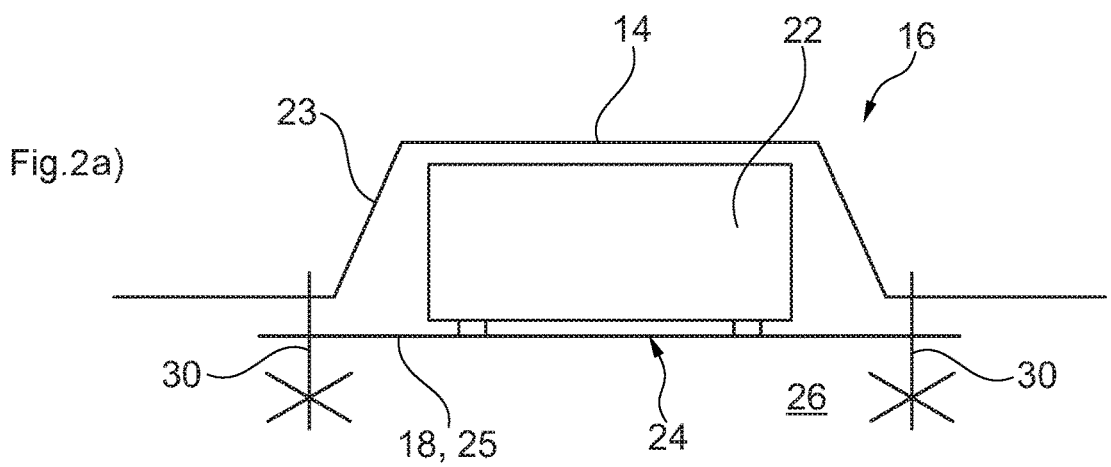
Fig. 2a)
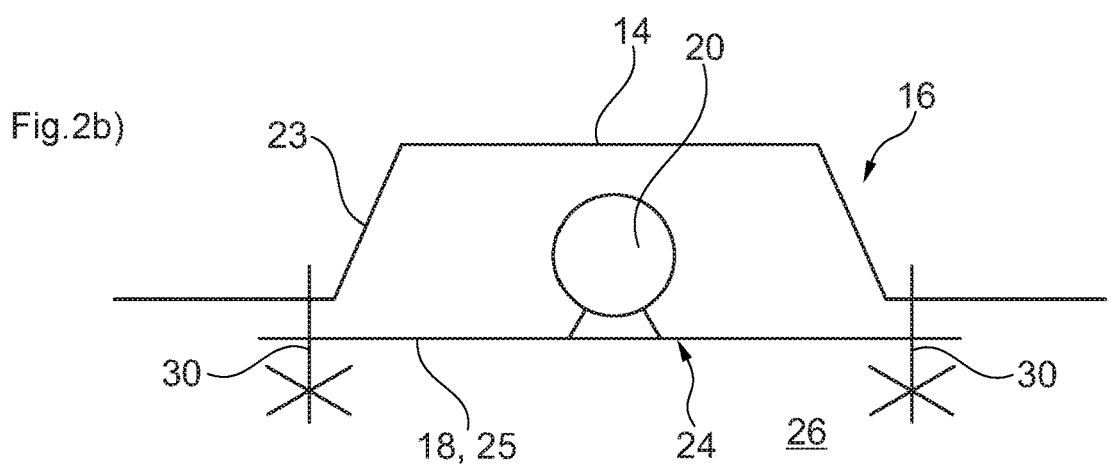
Fig. 2b)
Fig. 2

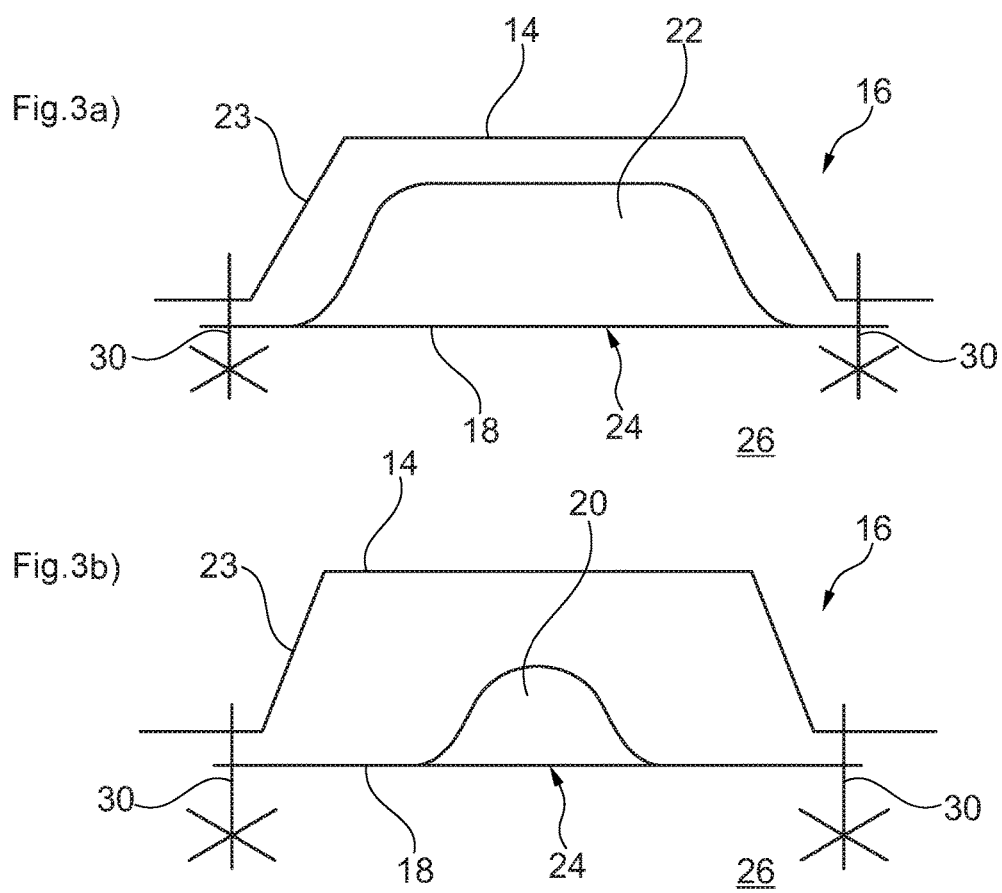
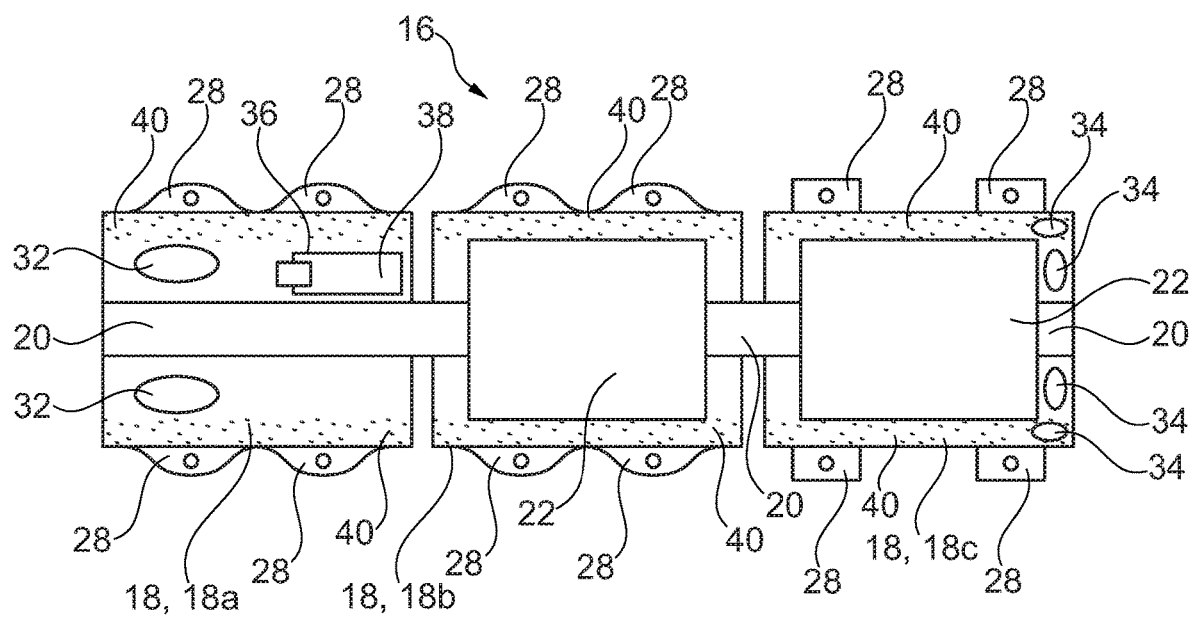

EXHAUST SYSTEM FOR A COMBUSTION ENGINE OF A MOTOR VEHICLE AND MOTOR VEHICLE

CROSS-REFERENCE TO RELATED APPLICATIONS

This application is a U.S. non-provisional application claiming the benefit of German Application No. 10 2017 130 866.0, filed on Dec. 21, 2017, which is incorporated herein by its entirety.

FIELD OF INVENTION

The invention relates to an exhaust system for a combustion engine of a motor vehicle. The invention also relates to a motor vehicle comprising a combustion engine and an exhaust system of the aforementioned type.

BACKGROUND OF THE INVENTION

Motor vehicles and exhaust systems are known in the art.

As part of the general attempt to make motor vehicles more lightweight in such a way that, among other things, the fuel consumption and the associated $CO_2$ emissions decrease, a general reduction in weight is likewise aimed for in the field of exhaust systems.

Against this background, the object of the invention is to set out an improved exhaust system.

SUMMARY OF THE INVENTION

An exhaust system comprises a support plate on which at least one exhaust line or at least one exhaust silencer is provided. The support plate is made of a plastic material. The construction of the exhaust system according to the invention thus fundamentally differs from known exhaust systems which are formed by a self-supporting structure of exhaust lines and exhaust treatment devices, for example exhaust silencers. In the exhaust system according to the invention, the exhaust line and/or the exhaust silencer are not self-supporting. Merely the carrier plate is configured as a supporting part, and in this connection stabilises the exhaust line and/or the exhaust silencer. Thus, merely the support plate is a structural part. Therefore, materials having a comparatively lower wall thickness can be used for the exhaust line and/or the exhaust silencer. For example, metal sheets or foils having wall thickness of 0.2 mm or less may be used. This construction results in a particularly light exhaust system overall. As a result of the support plate being made of plastic material, a further weight reduction can be achieved whilst the support plate still has the necessary stability.

The aforementioned exhaust silencer may be configured either as a passive exhaust silencer or as an active exhaust silencer. In this context, the active exhaust silencer preferably comprises a loudspeaker via which sound in antiphase with the sound carried by an exhaust flow, known as antisound, can be produced.

Preferably, the support plate is made of a fiber-reinforced plastic material. A good ratio between the weight of the support plate and the mechanical properties thereof can thus be achieved. In particular, in this way the support plate can be configured particularly rigid. Preferably, the support plate is made using a sheet molding compound (SMC). Materials of this type can be processed by pressing methods, making the manufacture of the support plate particularly simple and cost-effective. Preferably, a glass-fiber-reinforced plastic material is used. Plastic materials of this type have a particularly favorable ratio between costs, weight and mechanical properties.

Advantageously, the exhaust silencer and/or the exhaust line are made at least in portions of a plastic material, in particular a fiber-reinforced plastic material. In general, plastics material components are lighter than comparable metal components. This applies in particular to the present exhaust systems. Depending on the heat resistance of the plastic material and the temperature distribution within the exhaust system, it is also possible for only particular portions thereof to be made of plastic material. The remaining portions may for example be made of a metal material of which the heat resistance is known to be sufficient for exhaust systems. This results in a light exhaust system, the functionality and reliability of which are not impaired by the use of plastic material.

In a variant, the exhaust silencer and/or the exhaust line are additionally made integral at least in portions with the support plate. This is promoted by configuration of the support plate and the exhaust silencer and/or the exhaust line to be made of plastic material. As a result of the integral construction, assembly steps are dispensed with as compared to known exhaust systems. In addition, an exhaust system of this type is particularly light since fasteners which would otherwise be necessary can be omitted. The same applies to the material requirement for the exhaust system, which is comparatively low.

In one embodiment, the exhaust system is formed for arrangement in an underfloor tunnel of the motor vehicle, in particular the support plate is able to seal the underfloor tunnel at least in portions on the floor side. In this context, an underfloor tunnel may be understood to be a central tunnel or engine tunnel. In addition, this term also includes a tunnel provided specially for arranging the exhaust system in an underfloor of the motor vehicle. The underfloor tunnel is preferably formed by a portion of a floor plate of the motor vehicle. The arrangement of the exhaust system in the underfloor tunnel is particularly compact overall. In addition, a retracted arrangement of this type of the exhaust system reduces the air resistance of the motor vehicle at the underfloor. This support plate that seals the underfloor tunnel at the floor side also contributes to this, the floor side meaning that the support plate seals the underfloor tunnel on the side thereof facing the roadway. Further, the exhaust system is thus substantially protected from disruptive environmental effects, for example stone chips and/or splash water. By comparison with known exhaust systems arranged on an underside of the underfloor, an exhaust system according to the invention can thus be configured to be particularly light.

At least a portion of the underfloor tunnel may also, together with the support plate, form an exhaust system housing. The portion of the underfloor tunnel thus forms an upper shell of the exhaust system housing, and the support plate forms the associated lower shell. In this context, according to the invention, the exhaust line and/or the exhaust silencer are arranged within the exhaust system housing. In this context, insulating material may be provided between the exhaust system housing and the exhaust line and between the exhaust system housing and the silencer. Preferably, all cavities resulting within the exhaust system housing are filled with insulating material. By comparison with known exhaust systems, which have upper shells separate from the underfloor tunnel, an exhaust system according to the invention is of a particularly light and simple construction.

The support plate may additionally have fasteners with which the support plate can be fastened to an underfloor of the motor vehicle. The support plate is thus preferably fastened to the underfloor of the motor vehicle in such a way that it can be disassembled in a simple manner. For example, the support plate is fastened to the underfloor by screws which cooperate with fastening links arranged on the support plate. The support plate can thus be removed from the underfloor of the motor vehicle together with the exhaust line and/or the exhaust silencer, for example as part of maintenance or repair. This possibility of disassembly is also advantageous with a view to recycling at the end of the service life of the motor vehicle since if different materials are used for the support plate and the underfloor these can easily be separated from one another. To simplify assembly and disassembly, the exhaust lines have disconnection points at the appropriate positions.

In a variant, the support plate is formed in multiple parts, in particular the support plate is segmented along an exhaust flow direction. Along the exhaust flow direction, the support plate is thus formed from at least two segments. This facilitates assembly and disassembly of the support plate. Disconnection points are provided between the individual portions of the support plate. Further, the segmentation may provide thermal decoupling and/or oscillation decoupling of the individual segments.

In a preferred embodiment, the support plate has a disconnection point at least in a transition region between the hot end of the exhaust system and the cold end of the exhaust system. The disconnection point is thus located in the region of a first catalyst or a particle filter.

In particular, the support plate comprises at least one aeration opening and/or at least one de-aeration opening. The aeration opening and/or the de-aeration opening make air exchange possible between an environment of the motor vehicle and a volume delimited by the support plate. The air exchange may take place purely passively, during travel, for example as a result of headwind. Active air exchange is also possible. For this purpose, for example a ventilator or a compressor is provided in the region of the aeration opening and/or the de-aeration opening. In particular, the air exchange serves to dissipate heat introduced by an exhaust flow out of a region delimited by the support plate. The aeration opening and/or the de-aeration opening thus serve to cool the exhaust system.

In particular, the at least one aeration opening and/or the at least one de-aeration opening are arranged in an end region of the support plate along a direction of travel of the motor vehicle. For example, the at least one aeration opening is provided in a front end region and the at least one de-aeration region is provided in a rear end region. This results in a flow through the exhaust system, extending substantially parallel to the direction of travel.

The support plate may also have regions of differing rigidity and/or strength, in particular the support plate has a vibration damping region. A support plate of this type may in particular be configured as a support plate made of fiber-reinforced plastic material. The strength and/or rigidity of the support plate can thus be set as required for each region. In this connection, local stiffeners may also be provided. In particular, the support plate is configured rigid in the regions in which it carries the exhaust line and/or the exhaust silencer. In other regions, in particular in the regions via which the support plate is coupled to an underfloor of the motor vehicle, the support plate may be configured flexible. This provides oscillation-decoupling mounting of the support plate on the underfloor. Oscillation-decoupling additional elements can thus be omitted or configured smaller as compared to known exhaust systems.

Further, the support plate may have a service opening. An opening of this type is used for monitoring and/or maintaining the components of the exhaust system. In addition, the service opening may be used for assembly and/or disassembly of the exhaust system. Even if the support plate is dismountably fastened to the underfloor of a motor vehicle, it may be advantageous to carry out inspections and/or minor repairs via the service opening. The associated outlay is much lower.

In an alternative configuration, the support plate comprises a sealing flap which is formed to seal the service opening selectively. This prevents undesired articles or particles from the environment from penetrating into the exhaust system. In particular, entry of moisture and dirt can thus be prevented. This increases the reliability of the exhaust system. Further, when closed, the sealing flap may be part of a flow duct wall.

Advantageously, when mounted, the support plate has a drive-increasing and/or air-resistance-reducing surface on the floor side. This decreases the air resistance of a motor vehicle on which the exhaust system is mounted. This reduces the fuel consumption and $CO_2$ emissions of the motor vehicle in question. A drive-increasing surface causes a motor vehicle equipped therewith to be pushed in the direction of a roadway surface under the effect of the headwind. This is advantageous for driving stability and driving safety. In this connection, the support plate may be integrated into an air-resistance-reducing underfloor lining of the motor vehicle.

In addition, the support plate may be formed as a thermal insulation element, in particular as a heat shield, to thermally shield the exhaust system from an environment. The support plate thus ensures that, in particular at an underfloor of a motor vehicle equipped with the exhaust system according to the invention, the temperatures are kept in a prescribed range.

In addition, the invention comprises a vehicle of the type mentioned at the outset which comprises an exhaust system according to the invention, the exhaust system being arranged in an underfloor tunnel of the motor vehicle. Because an exhaust system of this type is particularly lightweight, the motor vehicle is also comparatively light. As a result of the arrangement of the exhaust system in the underfloor tunnel, the motor vehicle additionally has a relatively low air resistance. Further, the exhaust system is arranged in a compact manner in the underfloor, in such a way that the motor vehicle has a good amount of space for the passengers and/or has sufficient installation space for further technical components.

BRIEF DESCRIPTION OF THE DRAWINGS

Hereinafter, the invention is described with reference to various embodiments, which are shown in the accompanying drawings, in which:

FIG. 1 shows a motor vehicle according to the invention comprising an exhaust system according to the invention, FIG. 2 shows an exhaust system according to the invention comprising an exhaust silencer (FIG. 2a) and an exhaust system according to the invention comprising an exhaust line (FIG. 2b), each in a sectional drawing, FIG. 3 shows further exhaust systems according to the invention, an exhaust line (FIG. 3b) and an exhaust silencer (FIG. 3a) being made integral with a support plate, and FIG. 4 is a plan view of the exhaust systems according to the invention from the preceding drawings.

DETAILED DESCRIPTION

FIG. 1 shows a motor vehicle 10 comprising a combustion engine 12 and an exhaust system 16 which is arranged in an underfloor tunnel 14 of the motor vehicle 10.

The exhaust system 16 comprises a support plate 18 on which an exhaust silencer 22 (see FIGS. 2a and 3a) or an exhaust line 20 (see FIGS. 2b and 3b) is provided.

In addition, the support plate 18 seals the underfloor tunnel 14 at least in portions on the floor side.

The underfloor tunnel 14, together with the support plate 18, thus forms an exhaust system housing 23. In this connection, the underfloor tunnel 14 forms an upper shell of the exhaust system housing 23, and the support plate 18 forms a lower shell of the exhaust system housing 23.

In the present case, the support plate 18 is made of a fibre-reinforced plastics material.

When mounted, the support plate 18 further has a drive-increasing and/or air-resistance-reducing surface 24 on the floor side. This reduces the air resistance of the motor vehicle 10, and increases the drive, in other words the contact pressure of the vehicle on a roadway, during travel of the motor vehicle 10.

The support plate 18 further serves as a thermal insulation element. In the embodiment shown, the support plate 18 thermally shields the exhaust system 16 from an environment 26 as a heat shield 25.

For fastening the support plate 18 to the underfloor of the motor vehicle 10, the support plate 18 has fasteners 28 which in the present case are configured as fastening links (see FIG. 4). These are fastened to the underfloor via screws 30 (cf. FIGS. 2 and 3).

To make air exchange possible between the volume delimited by the underfloor tunnel 14 and support plate 18 and the environment 26, in the embodiment shown in FIG. 4 of the exhaust system 16, two aeration openings 32 and four de-aeration openings 34 are provided.

By way of example, the aeration openings 32 are arranged further forwards in a direction of travel of the motor vehicle 10 than the de-aeration openings 34. The region delimited by the support plate 18 and the underfloor tunnel 14 can thus be flowed through by the headwind.

The support plate 18 also has a service opening 36, which can be sealed selectively by a sealing flap 38. The service opening 36 and the sealing flap 38 make it possible to inspect components of the exhaust system 16 without having to dismount the exhaust system 16 from the motor vehicle 10.

The support plate 18 of the exhaust system 16 according to FIG. 4 additionally has regions of differing rigidity and/or strength. In this context, in particular a region 40 of reduced rigidity is provided, which is configured as a vibration-damping region. It provides oscillation-decoupled mounting of the support plate 18 on the underfloor of the motor vehicle 10.

In addition, the exhaust system 16 of FIG. 4 is formed in multiple parts. In this context, the support plate 18 is segmented into the segments 18a, 18b and 18c along an exhaust flow direction.

In the embodiments of FIG. 3, unlike in the embodiments of FIG. 2, the exhaust line 20 and the exhaust silencer 22 are made integral with the support plate 18. The support plate 18 and the exhaust line 20 or the support plate 18 and the exhaust silencer 22 are thus merely a single component.

In addition, in the embodiments shown, the exhaust silencer 22 and the exhaust line 20 are made of a plastic material. A fiber-reinforced plastic material can also be used at this point.

In the embodiments shown, the exhaust system 16 always has either an exhaust line 20 or an exhaust silencer 22. Naturally, it is also possible to combine these embodiments, resulting in an exhaust system 16 comprising both an exhaust line 20 and an exhaust silencer 22.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An exhaust system for a combustion engine of a motor vehicle, comprising:
    a support plate on which at least one exhaust line or at least one exhaust silencer is provided;
    wherein the support plate is made of a plastic material;
    wherein the exhaust system is formed to be arranged in an underfloor tunnel of the motor vehicle; and
    wherein at least a portion of the underfloor tunnel, together with the support plate, forms an exhaust system housing, and wherein the underfloor tunnel forms an upper shell of the exhaust system housing and the support plate forms a lower shell of the exhaust system housing.

2. The exhaust system of claim 1 wherein the support plate is made of a fiber-reinforced plastic material.

3. The exhaust system of claim 1 wherein at least one of the exhaust silencer and the exhaust line is made at least in portions of a plastic material.

4. The exhaust system of claim 1 wherein the at least one exhaust silencer and/or the at least one exhaust line are formed integral, at least in portions, with the support plate.

5. The exhaust system of claim 1 wherein the support plate has at least one fastener to fasten the support plate to an underfloor of the motor vehicle.

6. The exhaust system of claim 1 wherein the support plate is formed in multiple parts and is segmented along an exhaust flow direction.

7. The exhaust system of claim 1 wherein the support plate comprises at least one aeration opening and/or at least one de-aeration opening.

8. The exhaust system of claim 1 wherein the support plate has regions of differing rigidity and/or strength.

9. The exhaust system of claim 1 wherein the support plate has a service opening.

10. The exhaust system of claim 9 wherein the support plate comprises a sealing flap which is formed to seal the service opening selectively.

11. The exhaust system of claim 1 wherein, when mounted, the support plate has a drive-increasing and/or air-resistance-reducing surface on a floor side.

12. The exhaust system of claim 1 wherein the support plate is formed as a thermal insulation element that thermally shields the exhaust system from an environment.

13. The exhaust system of claim 3 wherein the plastic material comprises a fiber-reinforced plastic material.

14. The exhaust system of claim 1 wherein the support plate is capable of sealing the underfloor tunnel at least in portions on a floor side.

15. The exhaust system of claim 8 wherein the support plate includes a vibration damping region.

16. The exhaust system of claim 12 wherein the thermal insulation element comprises a heat shield.

17. The exhaust system of claim 1 wherein the at least one exhaust line or at least one exhaust silencer receives combustion engine exhaust gases generated by the combustion engine.

18. The exhaust system of claim 1 wherein the support plate seals portions of the underfloor tunnel on a floor side.

19. A motor vehicle comprising:
a combustion engine;
an exhaust system that includes a support plate on which at least one exhaust line or at least one exhaust silencer is provided;
wherein the support plate is made of a plastic material; and
wherein the exhaust system is arranged in an underfloor tunnel of the motor vehicle, wherein at least a portion of the underfloor tunnel, together with the support plate, forms an exhaust system housing, and wherein the underfloor tunnel forms an upper shell of the exhaust system housing and the support plate forms a lower shell of the exhaust system housing.

20. The motor vehicle of claim 19 wherein the support plate seals the underfloor tunnel at least in portions on a floor side.

* * * * *